UNITED STATES PATENT OFFICE.

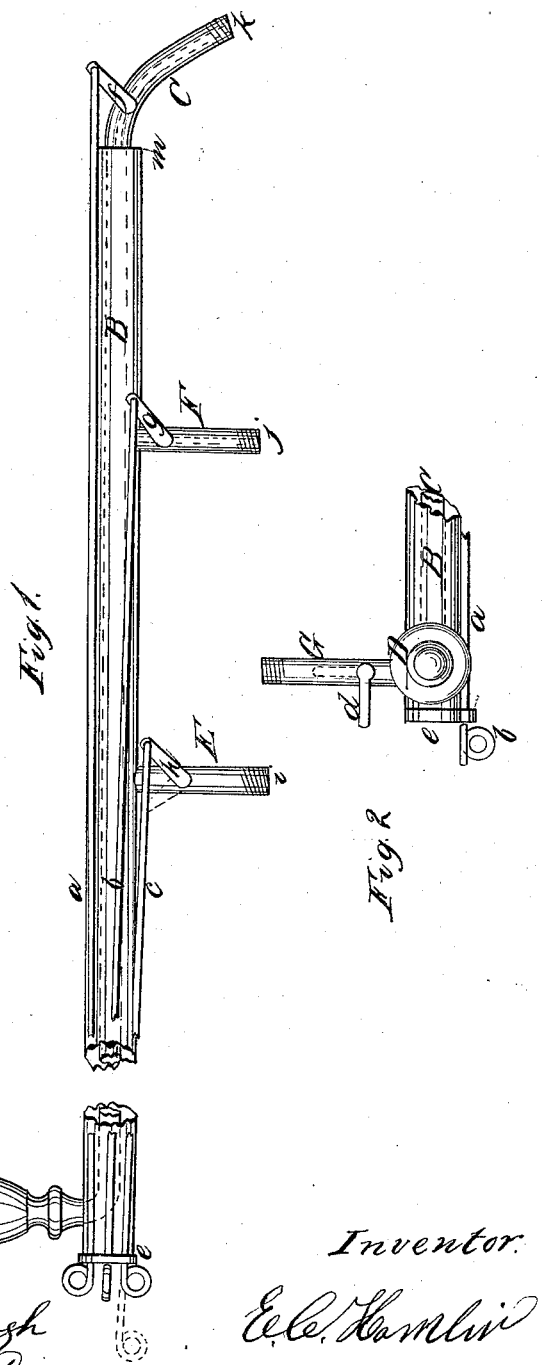

E. C. HAMLIN, OF PAVILION, NEW YORK.

IMPROVED LUBRICATOR FOR LOCOMOTIVE-ENGINES.

Specification forming part of Letters Patent No. 38,962, dated June 23, 1863; antedated December 27, 1862.

*To all whom it may concern:*

Be it known that I, E. C. HAMLIN, of Pavilion, in the county of Genesee and State of New York, have invented a new and useful device for oiling various parts of locomotive-engines; and I do hereby declare that the following is a full, clear, and exact description thereof, reference being had to the accompanying drawings, making a part of this specification, in which—

Figure 1 is a side elevation with a section toward the upper end broken away. Fig. 2 is a top view of the upper end, and showing the steam-pipe G, which connects with the boiler.

This invention consists in the application, to each side of locomotives, of several pipes leading from an oil pot or chamber to important parts of the working machinery, which necessarily require frequent oiling, and in combining the branch pipes with the main oil-pipe and the steam-pipe through which the oil-pipe passes, and the steam-pipe being connected to the boiler by a branch pipe which supplies it with steam, thus keeping the oil-pipe heated nearly its whole length, which prevents the oil from becoming chilled in cold weather, and keeps it constantly in a thin, lubricating condition, and by means of such arrangements of said pipes the engineer may at any and all seasons oil any part of his engine without leaving his position, by simply drawing the rod connected with the branch or branches leading to the parts he wishes to oil, thereby wholly avoiding the imminent danger of losing his life or limbs, which frequently occurs when he is obliged, as heretofore, to travel about on the engine, while in motion, to perform this duty.

To enable others skilled in the art to make and use my invention, I will proceed to describe its construction and operation.

The tubes or pipes B and C may be made of iron or other suitable material, and of any desired size. Probably five-eighths to three-fourths of an inch would be large enough for the inner or oil pipe, C, and one and one-fourth to one and one-half inch for the outer pipe, B.

The oil pipe C is bent at the upper end, as shown by the red dotted lines in Fig. 1, and just pierces the outer tube B, and the oil-pot D may have a threaded shank at the bottom to screw into the end of the oil-pipe, or it may be soldered on. The other end of pipe C is bent down and enters the steam-chest through an ordinary screw-coupling connected at $k$. The branch stocks E and F pass through the pipe B and enter the pipe C, the joint in both being made steam-tight. The said stocks E and F are provided with a screw-thread, (shown at $i$ and $j$, Fig. 1,) by which they may be connected with extension-pipes leading to the parts to be oiled. It may be desirable to have several branches leading off from each of the stocks E and F, in order that several parts may be oiled by each of the valve-rods $g$ and $h$, in which case those parts requiring most frequent oiling should be connected to one stock, and those requiring less connected to the other. This plan avoids the multiplication of the rods $b$ $c$ and valves or cocks $g$ and $h$. The head $e$ of the outer pipe, B, is extended on one side, and is pierced with holes through which the rods $b$ and $c$ pass. The said rods may be alphabetically lettered or numbered, if desired. Steam is supplied from the boiler to the pipe B through the pipe G, Fig. 2, and it may be let in or cut off by means of the cock $d$. There may be a drip-cock in the pipe B at $m$, to let off the condensed steam.

I claim—

1. The arrangement of the oil-pipe C (on locomotives) with the branches E and F, the cocks $f, g,$ and $h$, and their connecting-rods $a, b,$ and $c$, in the manner and for the purposes specified.

2. Combining the branch oil-pipes E and F, the branch steam-pipe G, the cocks $f, g,$ and $h$, and their connecting-rods $a, b,$ and $c$ with the main oil-pipe C and the steam-pipe B, in the manner and for the purpose specified.

E. C. HAMLIN.

Witnesses:
 DENBY LEWIS,
 W. H. GILMORE.